US010237826B2

(12) United States Patent
Azizi et al.

(10) Patent No.: US 10,237,826 B2
(45) Date of Patent: Mar. 19, 2019

(54) UTILIZING DC NULLS IN TRANSMISSION OF LOW POWER WAKE-UP PACKETS

(71) Applicant: INTEL CORPORATION, Santa Clara, CA (US)

(72) Inventors: Shahrnaz Azizi, Cupertino, CA (US); Thomas J. Kenney, Portland, OR (US); Minyoung Park, Portland, OR (US); Juan Fang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 207 days.

(21) Appl. No.: 15/277,740

(22) Filed: Sep. 27, 2016

(65) Prior Publication Data
US 2018/0091344 A1 Mar. 29, 2018

(51) Int. Cl.
H04L 5/00 (2006.01)
H04W 52/02 (2009.01)
(Continued)

(52) U.S. Cl.
CPC ....... H04W 52/0235 (2013.01); H04L 5/0053 (2013.01); H04L 5/0066 (2013.01); H04L 27/2613 (2013.01); H04W 84/12 (2013.01)

(58) Field of Classification Search
CPC ......... H04W 52/0229; H04W 52/0216; H04W 16/14; H04L 27/2675; H04L 27/2692; H04L 5/0048; H04L 5/0053
(Continued)

(56) References Cited

U.S. PATENT DOCUMENTS 9,525,540 B1 * 12/2016 Shellhammer ........ H04L 7/0012
2014/0121727 A1 * 5/2014 Wang ................ A61N 1/37276
607/60
(Continued)

FOREIGN PATENT DOCUMENTS

WO WO 2015/149837 10/2015

OTHER PUBLICATIONS

Hedayat, Reza "WUR and Efficiency Tradeoffs" IEEE 802.11-16/1147r1; Sep. 12, 2016.
(Continued)

Primary Examiner — Emmanuel Bayard
(74) Attorney, Agent, or Firm — Jason H. Vick; Sheridan Ross, PC

(57) ABSTRACT

Techniques have been proposed to transmit a wake-up packet at the central 26-tone resource unit of the IEEE 802.11ax OFDMA structure with a low-power wake-up radio packet within the OFDMA allocation. Prior techniques proposed to multiplex transmission of the wake-up packet with IEEE 802.11ax OFDMA PPDUs; leaving the RUs adjacent to the central 26-tone unassigned to function as guard bands. These guard bands are needed to reduce the impact of the adjacent channel interference on the LP-WUR. One embodiment transmits the 26×20 MHz/256=2.03125 MHz wake-up pulse at the center of (or in general anywhere within) the band (e.g., RU5) without requiring the nulling of the seven DC subcarriers. This moves the wakeup pulse inward leaving larger guard bands between the wake-up packet and the adjacent OFDMA allocations. This at least improves the LP-WUR detection performance and will allow assignment of more RUs to IEEE 802.11ax OFDMA PPDUs—Thereby improving overall system throughput and efficiency.

23 Claims, 7 Drawing Sheets

(51) Int. Cl.
*H04L 27/26* (2006.01)
*H04W 84/12* (2009.01)

(58) Field of Classification Search
USPC ............................. 375/219–222, 260, 355
See application file for complete search history.

(56) References Cited

U.S. PATENT DOCUMENTS

| | | |
|---|---|---|
| 2015/0334650 A1 | 11/2015 | Park |
| 2016/0072614 A1 | 3/2016 | Blankenship et al. |
| 2016/0183187 A1 | 6/2016 | Park |
| 2016/0218844 A1 | 7/2016 | Suh et al. |
| 2016/0219331 A1* | 7/2016 | Stewart ................. H04H 20/42 |
| 2016/0286549 A1 | 9/2016 | Abraham et al. |
| 2016/0330300 A1 | 11/2016 | Josiarn et al. |
| 2016/0374020 A1* | 12/2016 | Azizi ................. H04W 52/0229 |
| 2016/0380729 A1 | 12/2016 | Porat et al. |
| 2017/0034829 A1 | 2/2017 | Yang et al. |
| 2017/0111858 A1* | 4/2017 | Azizi ................. H04W 52/0212 |
| 2017/0134943 A1* | 5/2017 | Min ..................... H04W 12/06 |
| 2017/0202011 A1* | 7/2017 | Trainin ............. H04W 52/0216 |
| 2017/0265240 A1 | 9/2017 | Chen et al. |
| 2017/0272976 A1 | 9/2017 | Yang et al. |
| 2017/0303208 A1 | 10/2017 | Suh et al. |
| 2017/0332327 A1* | 11/2017 | Fang ..................... H04L 5/0007 |
| 2018/0019902 A1* | 1/2018 | Suh ....................... H04L 5/0007 |
| 2018/0077641 A1* | 3/2018 | Yang ..................... H04W 4/20 |
| 2018/0084501 A1* | 3/2018 | Mu ....................... H04L 5/0007 |
| 2018/0092036 A1* | 3/2018 | Azizi ................. H04W 52/0235 |
| 2018/0103431 A1* | 4/2018 | Suh ........................ H04B 1/16 |
| 2018/0124788 A1 | 5/2018 | Choi et al. |

OTHER PUBLICATIONS

Yao, Ke et al. "Demand of Being Woken Up While Moving Follow-Up" IEEE 802.11-16-1215r0; Sep. 12, 2016.
International Search Report for International Patent Application No. PCT/US2017/046056, dated Nov. 20, 2017.
Written Opinion for International Patent Application No. PCT/US2017/046056, dated Nov. 20, 2017.
Office Action (Restriction Requirement) for U.S. Appl. No. 15/278,489, dated May 3, 2018.
Office Action for U.S. Appl. No. 15/278,489, dated Jul. 27, 2018.

* cited by examiner

UTILIZING DC NULLS IN TRANSMISSION OF LOW POWER WAKE-UP PACKETS

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11n/ac/ax/ . . . communications systems and in general any wireless communications system or protocol, such as 4G, 4G LTE, 5G and later, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices and a Physical Layer (PHY). The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG—) within the IEEE 802.11 working group was considering improvements to spectrum efficiency to enhance system throughput/area in high density scenarios of APs (Access Points) and/or STAs (Stations).

To reduce power consumption, a Low-Power Wake-Up Receiver (LP-WUR) can be used with the above wireless protocols. The LP-WUR provides a low-power solution (e.g., ~100 μW in active state) for always-on Wi-Fi (or Bluetooth) connectivity of devices such as wearable devices, IoT (Internet of Things) and other emerging devices that will be densely deployed and used in the near future. The LP-WUR concept was introduced to the 802.11 community in late 2015, and since then has received much attention. There is an ongoing effort to soon start its standardization as part of the evolving IEEE 802.11 standards specification.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
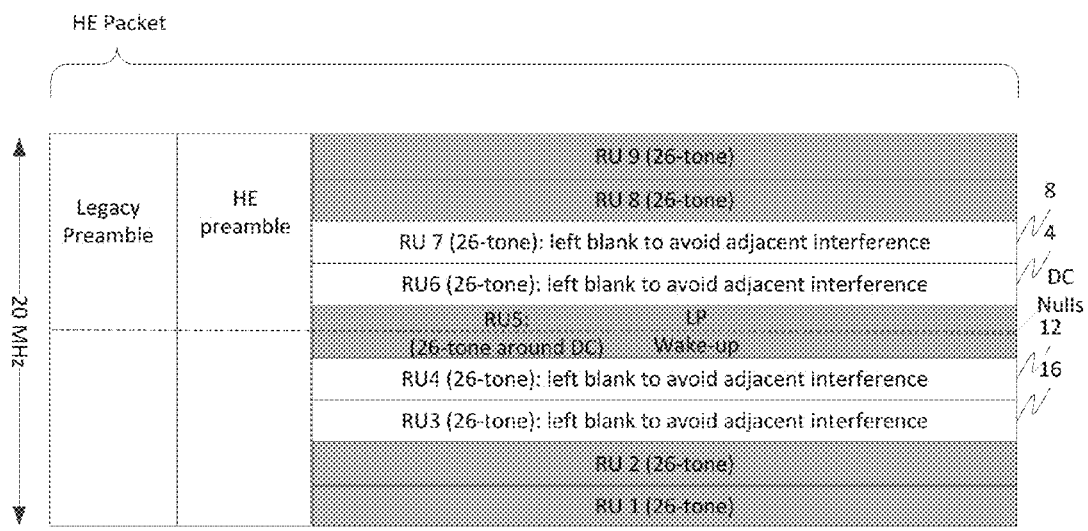
FIG. 1 illustrates an OFDMA low-power wake-up radio packet allocation.
Figure 2:
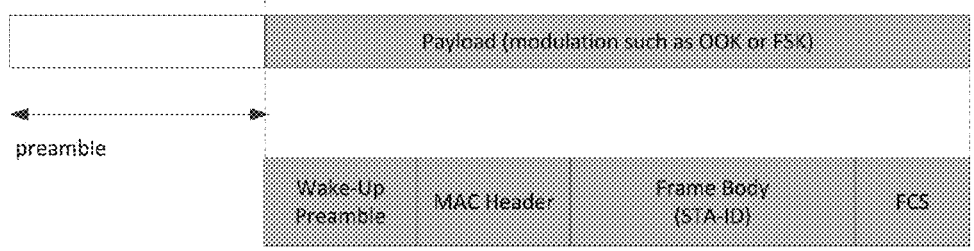
FIG. 2 illustrates a low-power wake-up radio packet within the OFDMA allocation.
Figure 3:
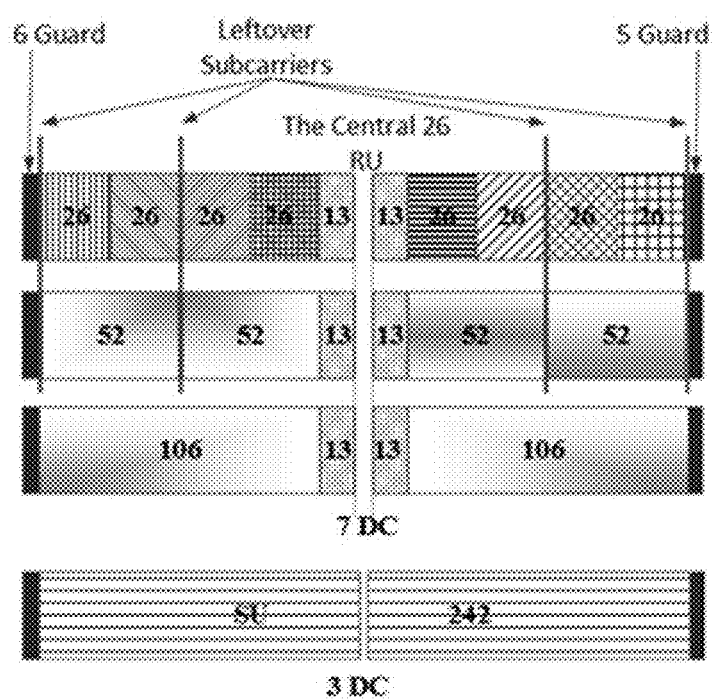
FIG. 3 illustrates a 20 MHz OFDMA structure as defined in IEEE 802.11ax.

Prior techniques propose to transmit a wake-up packet at the central 26-tone resource unit (RU) (RU5) of the IEEE 802.11ax OFDMA structure as shown in FIG. 1, with a low-power wake-up radio packet within the OFDMA allocation show in FIG. 2. For ease of reference, a diagram illustrating an IEEE 802.11ax OFDMA structure is shown in FIG. 3. The prior techniques proposed to multiplex transmission of the wake-up packet with IEEE 802.11ax OFDMA PPDUs ((PLCP) Protocol Data Unit); leaving the RUs adjacent to the central 26-tone (here RU6 (4), RU7 (8), RU4 (12) and RU3 (16)) unassigned to function as guard bands. These guard bands are needed to reduce the impact of the adjacent channel interference on the LP-WUR.

As can be seen in FIG. 1, the IEEE 802.11ax compatible wake-up packet was assumed to exactly occupy the same subcarriers as of the IEEE 802.11ax 26-tone RU (i.e., RU5), thereby leaving the seven DC nulls intact.

To analyse the number of guard bands required to minimize degradation for a wake-up packet within the OFDMA structure, computer simulations were conducted. The results are illustrated in FIG. 4.

Figure 4:
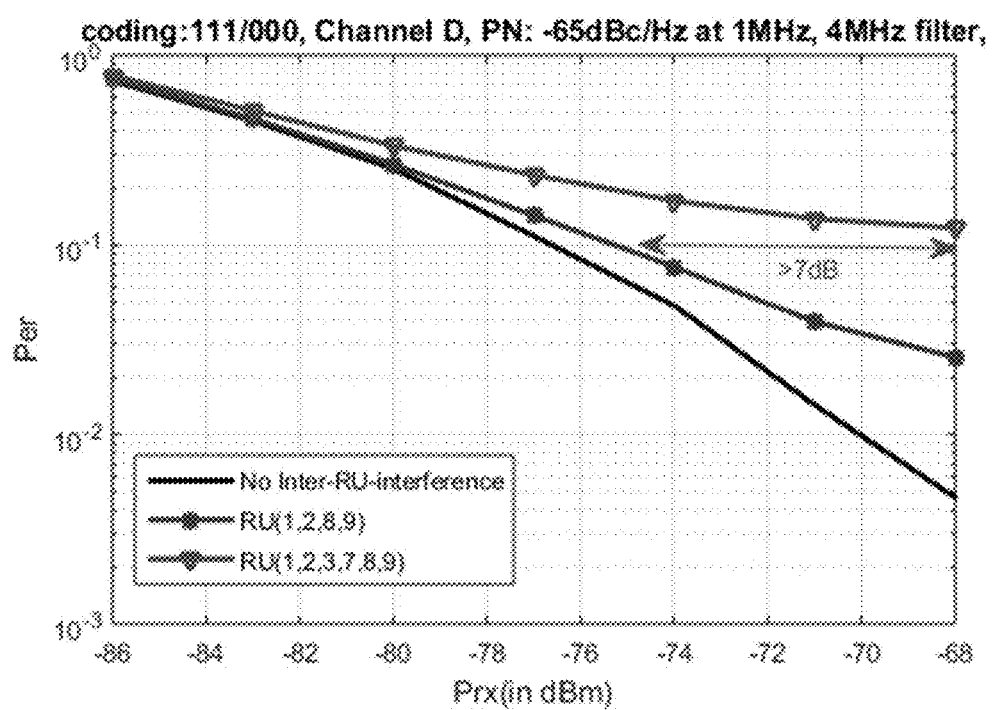
FIG. 4 illustrates a comparison in an IEEE Channel D model with interference from OFDMA signals in other resource units.

As seen in FIG. 4, if RU (1,2,3,7,8,9) are assigned to IEEE 802.11ax PPDUs, then the packet error performance of the LP-WUR degrades as much as 7 dB compared to the case when only RU (1,2,8,9) are assigned to IEEE 802.11ax PPDUs. In this case, the non-beamformed interference transmit power level on one RU is equal to the transmit power of the wake-up packet. The simulation scenario and parameters for FIG. 4 are as follows: The wake-up packet coding rate was 1/3 (111 to encode '1' and 000 to encode '0'), and the IEEE 802.11n channel model D was used, in addition to a relatively high level of phase noise of −65 dBc/Hz at 1 MHz, to capture the low power components used in the LP-WUR design.

Figure 5:
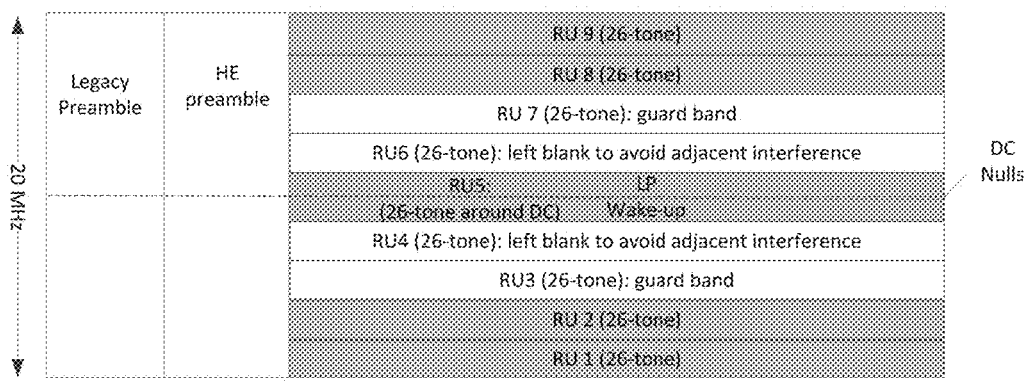
FIG. 5 illustrates an exemplary packet structure.

It can be seen that to minimize performance degradation for the LP-WUR, having RU #3 and #7 as guard bands as shown in FIG. 5 should be used. This is based in large part because of the large phase noise, which is the key to keeping the low power consumption at the LP-WUR. Having RU3 and RU7 as guard bands however reduces spectrum utilization.

One exemplary technological solution transmits the wake-up packet at the center of the band (e.g., at or around the dashed lines in the figure) utilizing the DC nulls. Since the LP-WUR uses OOK (On/Off Key) modulation, then a demodulator of the LP-WUR can utilize an envelope detector. Using such a detector, the energy folded into the DC region by a direct conversion receiver will not impact its performance as long as the DC value is considered in setting the detection threshold. The impact on IEEE 802.11ax receivers is negligible as will be discussed herein. By using an envelope detector, the setting of the detection threshold will govern the accuracy of detection of the wake-up packet.

One exemplary embodiment transmits the 26×20 MHz/256=2.03125 MHz wake-up pulse at the center of (or in general anywhere within) the band (e.g., RU5) without requiring the nulling of the seven DC subcarriers.

This moves the wakeup pulse inward leaving larger guard bands between the wake-up packet and the adjacent OFDMA allocations. This improves the LP-WUR detection performance and will allow assignment of more RUs to IEEE 802.11ax OFDMA PPDUs—Thereby improving overall system throughput and efficiency.

The known solution (See FIGS. 1 and 5) requires at least two 26-tone subchannels to be left as guard bands on each side of central wake-up pulse with the assumption that there is a large amount of phase noise experienced at the LP-WUR receiver.

Hence, while the existing solution has its applications, it can also be improved upon to increase spectrum efficiency. One exemplary solution has the LP-WUR set with a more stringent limit on adjacent channel rejection. This in turn requires much better phase noise and sharper filtering for the LP-WUR, both of which are expensive for the LP-WUR in terms of power consumption, and therefore defeats the whole motivation for having a LP-WUR.

However, an exemplary embodiment utilizes DC null tones for the LP-WUR to improve the adjacent resource unit interference rejection. The exemplary embodiment can be viewed as a method of trading-off between a LP-WUR phase noise requirement and the number of IEEE 802.11ax allocations that can be multiplexed with the wake-up packet in the same PPDU.

As mentioned above, the one exemplary embodiment transmits the 26×20 MHz/256=2.03125 MHz wake-up pulse at the center of the band without nulling the seven central subcarriers at and around DC. The proposed subcarrier indices corresponding to the IEEE 802.11ax RUs and wake-up pulse are defined in Table 1.

TABLE 1

| RU type | | | | | |
|---|---|---|---|---|---|
| 26-subcarrier | RU 1 [−121:−96] | RU 2 [−95:−70] | RU 3 [−68:−43] | RU 4 [−42:−17] | RU 5 [−16:−4, 4:16] |
| | RU 6 [17:42] | RU 7 [43:68] | RU 8 [70:95] | RU 9 [96:121] | — |
| 52-subcarrier | RU 1 [−121:−70] | RU 2 [−68:−17] | RU 3 [17:68] | RU 4 [70:121] | — |
| 106-subcarrier | RU 1 [−122:−17] | | RU 2 [17:122] | | — |
| 242-subcarrier | RU 1 [−122:−2, 2:122] | | | | |

In the exemplary Table 1, −16:−13 & 14:16 are left nulls as guard bands and there are some null unused subcarriers in-between RUs.

Performance Impact at the LP-WUR

The LP-WUR receives OOK modulated signals. Each OOK pulse occupies 26 subcarriers as illustrated in Table 1. Since the wake-up packet can use OOK modulation, then the demodulator of the LP-WUR can utilize an envelope detector as discussed. Using such a detector, the energy folded into the DC region by a direct conversion receiver will not impact its performance. The DC value only impacts selection of the detection threshold. Once the threshold is set correctly, the DC value would not impact its packet error performance (PER). Since the use of envelope detectors is well known, a detailed discussion thereof is not required.

To avoid having a long wake-up packet transmission, one exemplary embodiment keeps the duration of wake-up pulse (OOK pulse) equal to 1×OFDM Symbol (1×Sym) duration. This will result in only 6 or 7 non-zero subcarriers for the wake-up pulse. The reason is that 1×Sym is equivalent to a 64-point FFT instead of the 256-point FFT of IEEE 802.11ax is that a 52-tone RU in a 256 pt-FFT will be equivalent to 13 tones in 64 pt-FFT, and hence 26-tones will be 6 or 7 subcarriers in 64-pt FFT.

With this in mind, the eventual subcarrier assignment in a 256 pt-FFT for the wake-up pulse can look like [x1, 0,0,0,x2, 0,0,0, x3, 0,0,0, 0,0, 0,0,0, x4, 0,0,0,x5, 0,0,0,x6] (where xn is a non-zero value), which effectively has null subcarriers in the center.

Performance Impact at the IEEE 802.11ax Receivers

As shown in FIG. 2, the wake-up packet transmission is aligned with the data portion of the HE-packet. Therefore, IEEE 802.11ax receivers will be able to receive and decode the preamble portion for the entire bandwidth, which is critical to having the LP-WUR not introduce any degradation to the IEEE 802.11ax PPDUs. After the HE-SIG-B field of the preamble is decoded, the IEEE 802.11ax receiver knows which RU is assigned to it, if any.

FIGS. 1, 2 and FIG. 5 show where the wake-up packet is multiplexed with IEEE 802.11ax OFDMA PPDUs. The IEEE 802.11ax STAs that have decoded the HE-SIG-B and know that there are no RUs assigned to them, will set their NAV timers and will terminate the receive operation. However, the IEEE 802.11ax receiver that does have an RU assigned to it will continue decoding the packet after filtering and considering only its assigned RU. This means that the IEEE 802.11ax receiver will ignore the central 26-tone anyway regardless of the value at the DC subcarrier. The questions are then:

i) whether the DC value would impact the ADC (Analog to Digital Converter) dynamic range since AGC (Automatic Gain Control) is already adjusted based on the preamble—which has not carried OOK modulated symbols. It is noted that the IEEE 802.11ax OFDMA receiver will re-adjust the AGC based on HE-STF corresponding to its RU assignment. Hence, there will be no negative impact from non-nulls at DC.

ii) will there be any DC leakage from the wake-up pulse to the received RU due to the CFO (Carrier Frequency Offset)? According to Table 1, the closest subcarrier indices of IEEE 802.11ax RUs to the DC are at indices −43 (RU 3) and +43 (RU 7). Therefore, even the largest possible CFO will cause negligible leakage.

The above technical proposal then at least will not have a negative impact on IEEE 802.11ax receivers.

Another point of view of this technology can be viewed as the seven central subcarrier indices are to be considered as part of wake-up pulse. By doing so, the wake-up pulse is pushed inward toward the center of the band leaving more subcarriers as guard tones between the wake-up packet and IEEE 802.11ax OFDMA allocations. This at least enables a tradeoff between multiplexing IEEE 802.11ax STAs at RUs 3 and 7 vs. a phase noise requirement at the LP-WUR. Overall, the technology provides a tradeoff between power consumption at LP-WUR vs. spectrum utilization given certain adjacent subchannel rejection requirements.

As discussed however, the wake-up pulse need not be directly at the center of the band. Variations from the center of the band would still allow more subcarriers as guard tones between the wake-up packet and IEEE 802.11ax OFDMA allocations, thereby still improving spectrum utilization.

Figure 6:
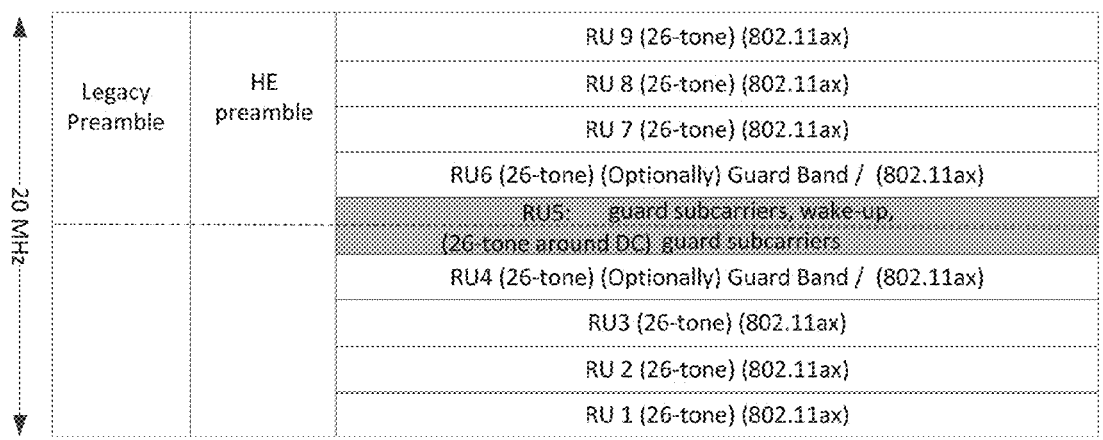
FIG. 6 illustrates an exemplary packet structure with improved spectrum utilization.

This is exemplified in FIG. 6 where RU6 and RU4 optionally can be either guard bands or 802.11ax OFDMA allocations.

Figure 7:
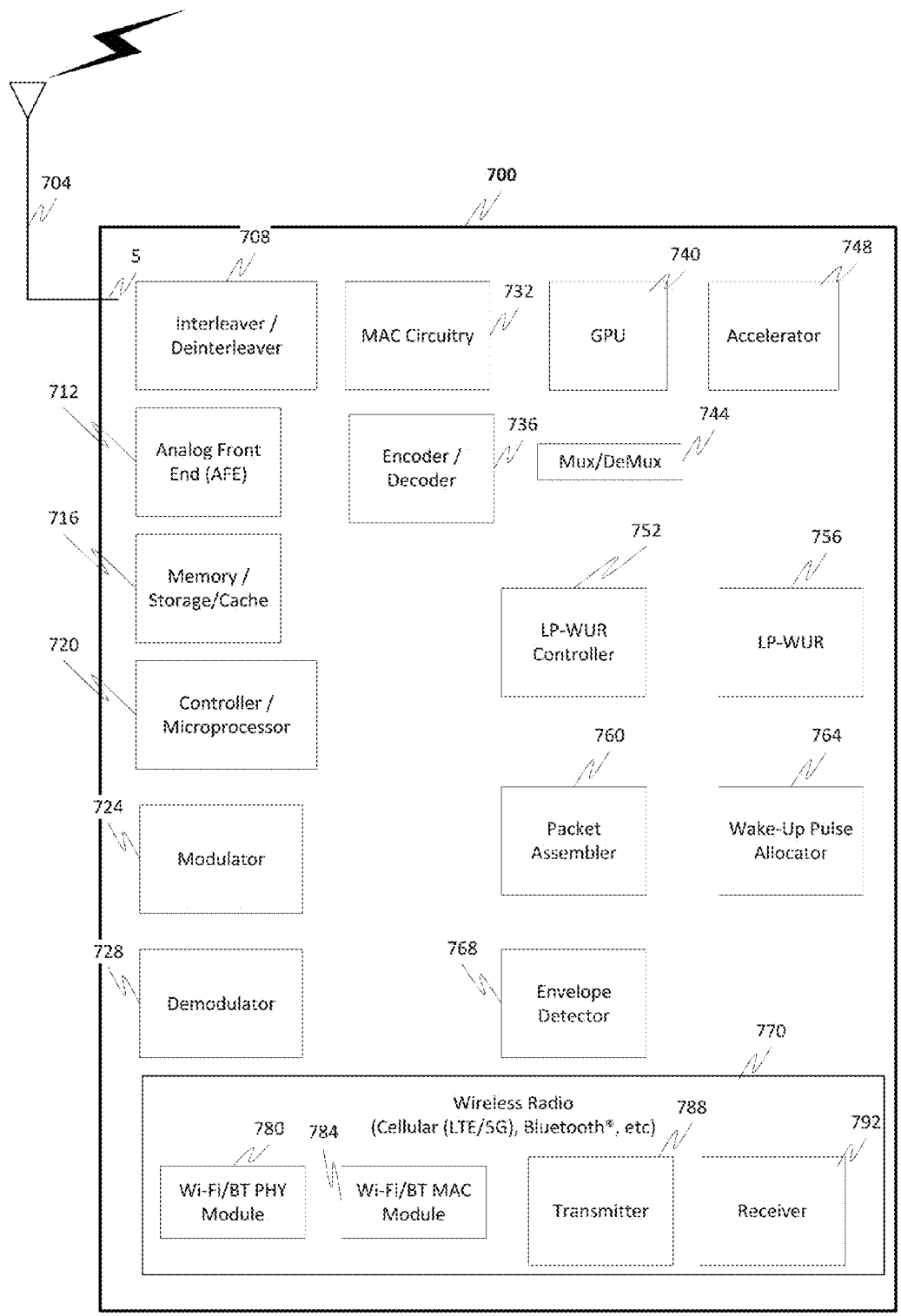
FIG. 7 illustrates an exemplary wireless device.

FIG. 7 illustrates an exemplary hardware diagram of a device 700, such as a wireless device, mobile device, access point (AP), station (STA), or the like, that is adapted to implement the technique(s) discussed herein.

In addition to well-known componentry (which has been omitted for clarity), the device 700 includes interconnected elements including one or more of: one or more antennas 704, an interleaver/deinterleaver 708, an analog front end (AFE) 712, memory/storage/cache 716, controller/microprocessor 720, MAC circuitry 732, modulator 724, demodulator 728, encoder/decoder 736, GPU 740, accelerator 748, a multiplexer/demultiplexer 744, LP-WUR controller 752, LP-WUR 756 (which optionally may have its own demodulator, antenna, etc., to complement its low-power operation), packet assembler 760, wake-up pulse allocator 764, envelope detector 768 and wireless radio 770 components such as a Wi-Fi PHY module/circuit 780, a Wi-Fi/BT MAC module/circuit 784, transmitter 788 and receiver 792. The various elements in the device 700 are connected by one or more links/connections (not shown, again for sake of clarity).

The device 700 can have one more antennas 704, for use in wireless communications such as Wi-Fi, multi-input multi-output (MIMO) communications, multi-user multi-input multi-output (MU-MIMO) communications Bluetooth®, LTE, 5G, 60 Ghz, WiGig, mmWave systemsm, etc. The antenna(s) 704 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 704 generally interact with the Analog Front End (AFE) 712, which is needed to enable the correct processing of the received modulated signal and signal conditioning for a transmitted signal. The AFE 712 can be functionally located between the antenna and a digital baseband system in order to convert the analog signal into a digital signal for processing, and vice-versa.

The device 700 can also include a controller/microprocessor 720 and a memory/storage/cache 716. The device 700 can interact with the memory/storage/cache 716 which may store information and operations necessary for configuring and transmitting or receiving the information described herein. The memory/storage/cache 716 may also be used in connection with the execution of application programming or instructions by the controller/microprocessor 720, and for temporary or long term storage of program instructions and/or data. As examples, the memory/storage/cache 720 may comprise a computer-readable device, RAM, ROM, DRAM, SDRAM, and/or other storage device(s) and media.

The controller/microprocessor 720 may comprise a general purpose programmable processor or controller for executing application programming or instructions related to the device 700. Furthermore, the controller/microprocessor 720 can cooperate with one or more other elements in the device 700 to perform operations for configuring and transmitting information as described herein. The controller/microprocessor 720 may include multiple processor cores, and/or implement multiple virtual processors. Optionally, the controller/microprocessor 720 may include multiple physical processors. By way of example, the controller/microprocessor 720 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 700 can further include a transmitter 788 and receiver 792 which can transmit and receive signals, respectively, to and from other wireless devices and/or access points using the one or more antennas 704. Included in the device 700 circuitry is the medium access control or MAC Circuitry 732. MAC circuitry 732 provides for controlling access to the wireless medium. In an exemplary embodiment, the MAC circuitry 732 may be arranged to contend for the wireless medium and configure frames or packets for communicating over the wireless medium.

The device 700 can also optionally contain a security module (not shown). This security module can contain information regarding but not limited to, security parameters required to connect the device to an access point or other device, or vice versa, or other available network(s), and can include WEP or WPA/WPA-2 (optionally+AES and/or TKIP) security access keys, network keys, etc. As an example, the WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

As shown in FIG. 7, the exemplary device 700 can also include a GPU 740, an accelerator 748, multiplexer/demultiplexer 744, a Wi-Fi/BT/BLE PHY module 780 and a Wi-Fi/BT/BLE MAC module 784 that at least cooperate with one or more of the other components as discussed herein.

In operation, exemplary behavior of a wireless system commences with the transmitter side of a communication system including, for example, two or more of the wireless devices 700.

When it is determined that wake-up of a main radio is required, the LP-WUR controller 752, communicating with the packet assembler 760, wake-up pulse allocator 764, controller 720 and memory 716 assemble a wake-up pulse for a wake-to packet to be transmitted to a receiving transceiver, to wake-up the main radio of the receiving transceiver.

As discussed, the packet assembler 760 and wake-up pulse allocator 764 allocate the wake-up pulse to the approximate center of the band without nulling the central subcarriers around DC. The LP-WUR controller 752, communicating with the packet assembler 760, wake-up pulse allocator 764, controller 720 and memory 716 also allocate guard bands around the wake-up pulse.

The LP-WUR controller 752, communicating with the packet assembler 760, wake-up pulse allocator 764, controller 720 and memory 716 then allocate subcarrier indices corresponding to IEEE 802.11ax RUs.

The transmitter 788 then transmits the wake-up packet.

At the receiving transceiver (which can also include the components illustrated in FIG. 7), the LP-WUR 756 receives the wake-up packet. A demodulator (such as the one associated with the LP-WUR) demodulates the received wakeup packet and uses the envelope detector 768 to detect the wake-up pulse in the wake-up packet. The LP-WUR 756 then triggers the wake-up of one or more wireless radio components 770-792.

Figure 8:
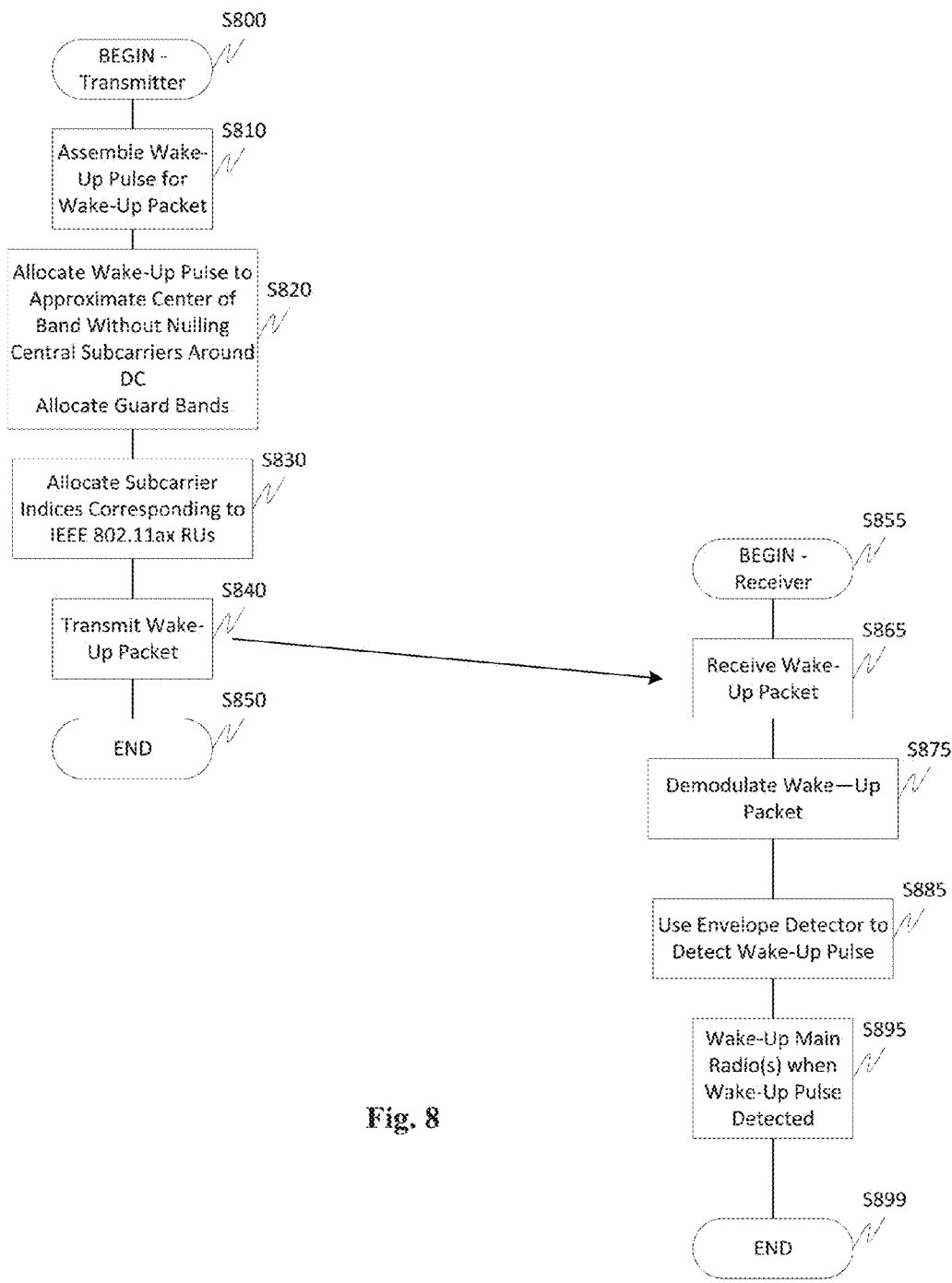
FIG. 8 is a flowchart outlining an exemplary technique for wake-up pulse management.

FIG. 8 outlines an exemplary methodology for improving spectrum efficiency for a wireless radio, and in particular a LP-WUR.

Control begins in step S800 for a transmitting transceiver and continues to step S810. In step S810, the wake-up pulse for the wake-up packet is assembled. next, in step S820, the wake-up pulse is allocated to the approximate center of the band without nulling the central subcarriers around DC. The guard bands are also allocated. Control then continues to step S830.

In step S830, the subcarrier indices are allocated corresponding to IEEE 802.11ax RUs. Next, in step S840 the wake-up packet is transmitted with control continuing to step S850 where the control sequence ends.

For the receiving transceiver, control begins in step S855 and continues to step S865. In step S865, the LP-WUR receives the wake-up packet. next, in step S875, the wake-up packet is demodulated. Control then continues to step S885.

In step S885, the wake-up pulse is detected. Next, in step S895, the main radio(s) are woken up with control continuing to step S899 where the control sequence ends.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments are described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising:

a LP-WUR (Low-Power Wake-Up Radio) controller that assembles a wake-up pulse for a wake-up packet;

the LP-WUR controller communicating with a packet assembler, a wake-up pulse allocator and a processor to:

allocate the wake-up pulse to an approximate center of a band, wherein the central subcarriers around DC are not nulled and, allocate guard bands, and allocate subcarrier indices corresponding to resource units (RUs); and a transmitter that transmits the packet with the wake-up pulse.

Any one or more of the above aspects, wherein the allocation of subcarrier indices corresponds to IEEE 802.11ax RUs.

Any one or more of the above aspects, wherein the wake-up packet is embedded in a high efficiency packet.

Any one or more of the above aspects, further comprising a demodulator that receives the wake-up packet from the LP-WUR and demodulates the wake-up packet.

Any one or more of the above aspects, further comprising an envelope detector adapted to detect the wake-up pulse.

Any one or more of the above aspects, wherein the wake-up packet comprises a preamble, header, and a frame body.

Any one or more of the above aspects, wherein RUs 1-4 and RUs 6-9 are IEEE 802.11ax resource units, and one or more of RUs 1-4 and RUs 6-9 are left null to function as a guard band to mitigate interference.

Any one or more of the above aspects, further comprising one or more connected elements including a receiver, an interleaver/deinterleaver, an analog front end, a GPU, an accelerator, an encoder/decoder, one or more antennas, a processor and memory.

A non-transitory information storage media having stored thereon one or more instructions, that when executed by one or more processors, cause a wireless communications device to perform a method comprising:

assembling a wake-up pulse for a wake-up packet;

allocating the wake-up pulse to an approximate center of a band, wherein the central subcarriers around DC are not nulled;

allocating guard bands;

allocating subcarrier indices corresponding to resource units (RUs); and transmitting the packet with the wake-up pulse.

Any one or more of the above aspects, wherein the allocation of subcarrier indices corresponds to IEEE 802.11ax RUs.

Any one or more of the above aspects, wherein the wake-up packet is embedded in a high efficiency packet.

Any one or more of the above aspects, further comprising receiving the wake-up packet from the LP-WUR and demodulating the wake-up packet.

Any one or more of the above aspects, further comprising detecting the wake-up pulse.

Any one or more of the above aspects, wherein the wake-up packet comprises a preamble, header, and a frame body.

Any one or more of the above aspects, wherein RUs 1-4 and RUs 6-9 are IEEE 802.11ax resource units, and one or more of RUs 1-4 and RUs 6-9 are left null to function as a guard band to mitigate interference.

A wireless communications device comprising:

means for assembling a wake-up pulse for a wake-up packet;

means for allocating the wake-up pulse to an approximate center of a band, wherein the central subcarriers around DC are not nulled and;

means for allocating guard bands;

means for allocating subcarrier indices corresponding to resource units (RUs); and means for transmitting the packet with the wake-up pulse.

Any one or more of the above aspects, wherein the allocation of subcarrier indices corresponds to IEEE 802.11ax RUs.

Any one or more of the above aspects, wherein the wake-up packet is embedded in a high efficiency packet.

Any one or more of the above aspects, further comprising receiving the wake-up packet from the LP-WUR and demodulating the wake-up packet.

Any one or more of the above aspects, further comprising detecting the wake-up pulse.

Any one or more of the above aspects, wherein the wake-up packet comprises a preamble, header, and a frame body.

Any one or more of the above aspects, wherein RUs 1-4 and RUs 6-9 are IEEE 802.11ax resource units, and one or more of RUs 1-4 and RUs 6-9 are left null to function as a guard band to mitigate interference.

A method for operating a wireless device comprising:

assembling a wake-up pulse for a wake-up packet;

allocating the wake-up pulse to an approximate center of a band, wherein the central subcarriers around DC are not nulled;

allocating guard bands;

allocating subcarrier indices corresponding to resource units (RUs); and transmitting the packet with the wake-up pulse.

Any one or more of the above aspects, wherein the allocation of subcarrier indices corresponds to IEEE 802.11ax RUs.

Any one or more of the above aspects, wherein the wake-up packet is embedded in a high efficiency packet.

Any one or more of the above aspects, further comprising receiving the wake-up packet from the LP-WUR and demodulating the wake-up packet.

Any one or more of the above aspects, further comprising detecting the wake-up pulse.

Any one or more of the above aspects, wherein the wake-up packet comprises a preamble, header, and a frame body.

Any one or more of the above aspects, wherein RUs 1-4 and RUs 6-9 are IEEE 802.11ax resource units, and one or more of RUs 1-4 and RUs 6-9 are left null to function as a guard band to mitigate interference.

A wireless communications device comprising:
a LP-WUR (Low Power Wake-Up Radio);
a demodulator that receives a wake-up packet from the LP-WUR and demodulates the wake-up packet, the wake-up packet comprising a wake-up pulse, the wake-up pulse having been allocated to an approximate center of a band, wherein central subcarriers around DC and not nulled, guard bands were allocated, and subcarrier indices corresponding to resource units (RUs) were allocated; and
a main radio, the main radio receiving a wake-up command from the LP-WUR.

Any one or more of the above aspects, further comprising an envelope detector adapted to detect the wake-up pulse.

Any one or more of the above aspects, wherein the wake-up packet comprises a preamble, header, and a frame body.

Any one or more of the above aspects, wherein RUs 1-4 and RUs 6-9 are IEEE 802.11ax resource units, and one or more of RUs 1-4 and RUs 6-9 are left null to function as the guard bands to mitigate interference.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a LP-WUR (Low-Power Wake-Up Radio) controller that assembles a wake-up pulse for a wake-up packet;
the LP-WUR controller communicating with a packet assembler, a wake-up pulse allocator and a processor to:
allocate the wake-up pulse to an approximate center of a band, wherein central subcarriers around DC are not nulled and,
allocate guard bands, and
allocate subcarrier indices corresponding to resource units (RUs); and
a transmitter that transmits the packet with the wake-up pulse.

2. The wireless communications device of claim 1, wherein the allocation of subcarrier indices corresponds to IEEE 802.11ax RUs.

3. The wireless communications device of claim 1, wherein the wake-up packet is embedded in a high efficiency packet.

4. The wireless communications device of claim 1, further comprising a demodulator that receives the wake-up packet from the LP-WUR and demodulates the wake-up packet.

5. The wireless communications device of claim 1, further comprising an envelope detector adapted to detect the wake-up pulse.

6. The wireless communications device of claim 1, wherein the wake-up packet comprises a preamble, header, and a frame body.

7. The wireless communications device of claim 1, wherein RUs 1-4 and RUs 6-9 are 802.11ax resource units, and one or more of RUs 1-4 and RUs 6-9 are left nulls to function as a guard band to mitigate interference.

8. The wireless communications device of claim 1, further comprising one or more connected elements including a receiver, an interleaver/deinterleaver, an analog front end, a GPU, an accelerator, an encoder/decoder, one or more antennas, a processor and memory.

9. A non-transitory information storage media having stored thereon one or more instructions, that when executed by one or more processors, cause a wireless communications device to perform a method comprising:
assembling a wake-up pulse for a wake-up packet;
allocating the wake-up pulse to an approximate center of a band, wherein central subcarriers around DC are not nulled;
allocating guard bands;
allocating subcarrier indices corresponding to resource units (RUs); and
transmitting the packet with the wake-up pulse.

10. The media of claim 9, wherein the allocation of subcarrier indices corresponds to IEEE 802.11ax RUs.

11. The media of claim 9, wherein the wake-up packet is embedded in a high efficiency packet.

12. The media of claim 9, further comprising receiving the wake-up packet from the LP-WUR and demodulating the wake-up packet.

13. The media of claim 9, further comprising detecting the wake-up pulse.

14. The media of claim 9, wherein the wake-up packet comprises a preamble, header, and a frame body.

15. The media of claim 9, wherein RUs 1-4 and RUs 6-9 are 802.11ax resource units, and one or more of RUs 1-4 and RUs 6-9 are left nulls to function as a guard band to mitigate interference.

16. A wireless communications device comprising:
means for assembling a wake-up pulse for a wake-up packet;
means for allocating the wake-up pulse to an approximate center of a band, wherein central subcarriers around DC are not nulled and;
means for allocating guard bands;
means for allocating subcarrier indices corresponding to resource units (RUs); and
means for transmitting the packet with the wake-up pulse.

17. The device of claim 16, wherein the allocation of subcarrier indices corresponds to IEEE 802.11ax RUs.

18. The device of claim 16, wherein the wake-up packet is embedded in a high efficiency packet.

19. The device of claim 16, further comprising receiving the wake-up packet from the LP-WUR and demodulating the wake-up packet.

20. The device of claim 16, further comprising detecting the wake-up pulse.

21. The device of claim 16, wherein the wake-up packet comprises a preamble, header, and a frame body.

22. The device of claim 16, wherein RUs 1-4 and RUs 6-9 are 802.11ax resource units, and one or more of RUs 1-4 and RUs 6-9 are left nulls to function as a guard band to mitigate interference.

23. A method for operating a wireless device comprising:
  assembling a wake-up pulse for a wake-up packet;
  allocating the wake-up pulse to an approximate center of a band, wherein central subcarriers around DC are not nulled;
  allocating guard bands;
  allocating subcarrier indices corresponding to resource units (RUs); and
  transmitting the packet with the wake-up pulse.

* * * * *